Figure 5:
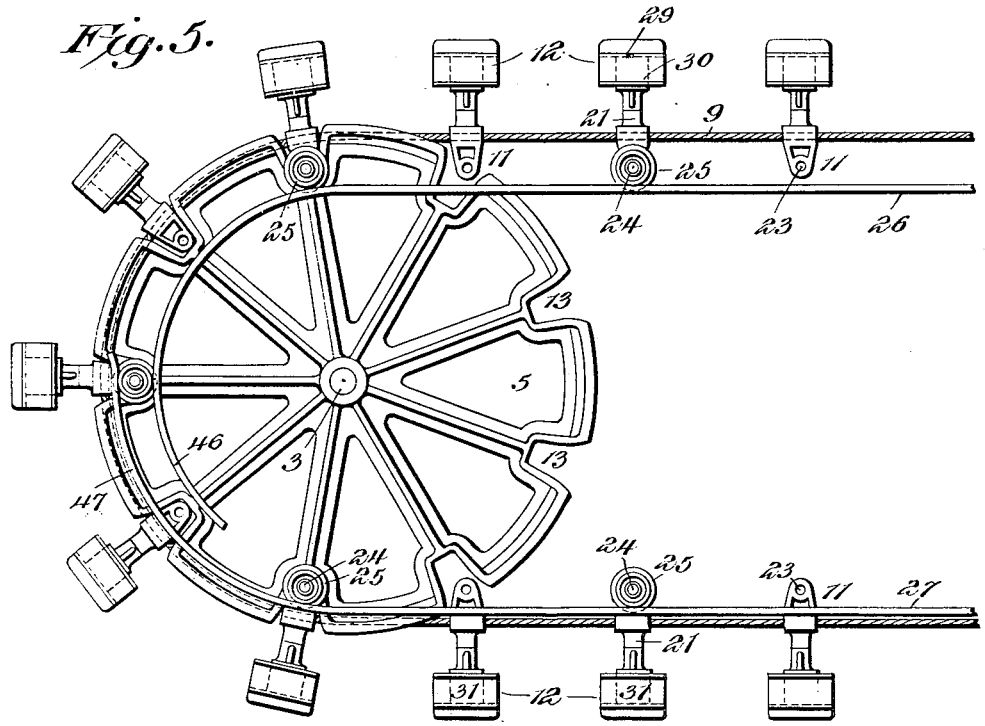

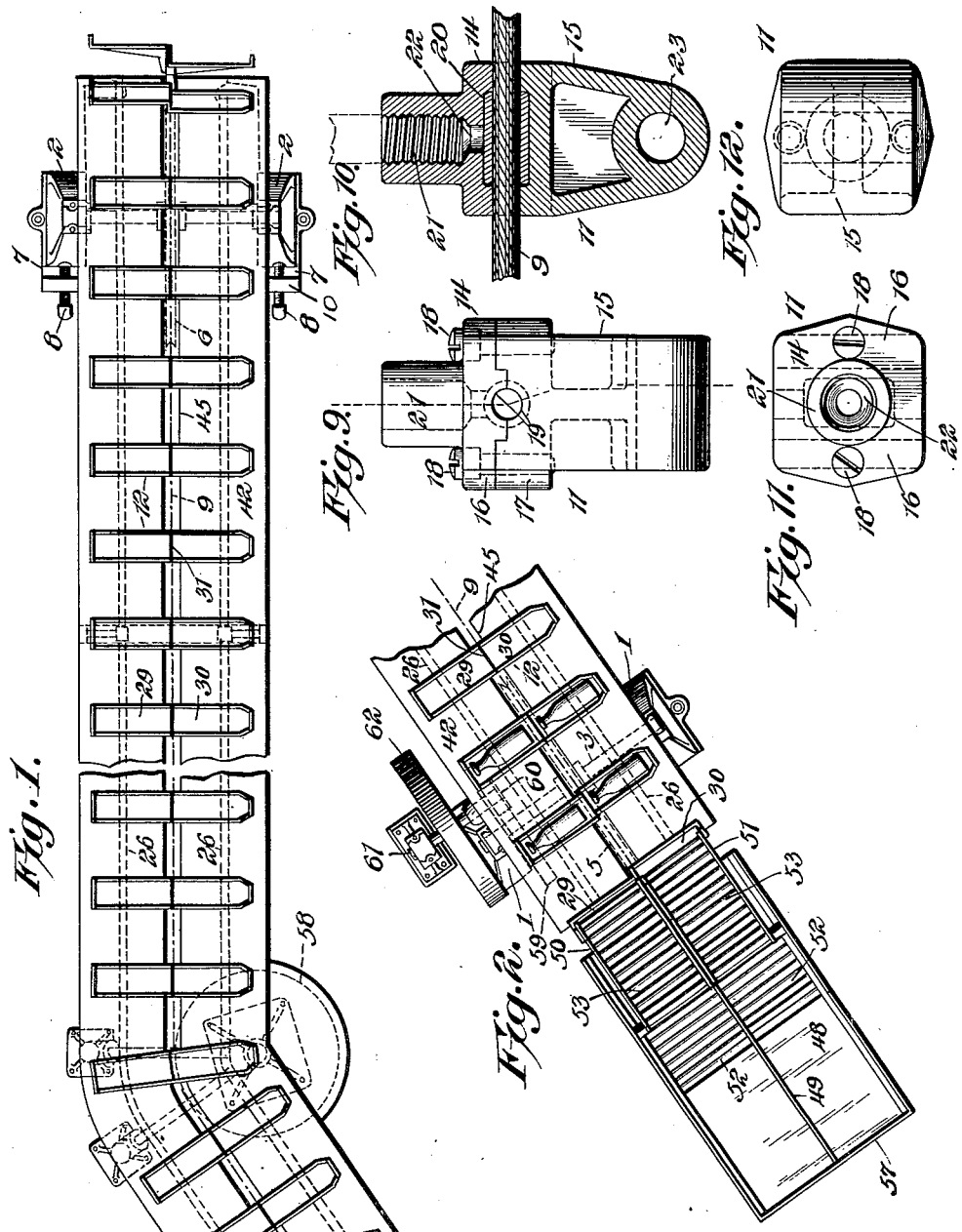

No. 800,639. PATENTED OCT. 3, 1905.
J. F. GEGENHEIMER.
CONVEYER FOR BOTTLES, &c.
APPLICATION FILED OCT. 15, 1903.
3 SHEETS—SHEET 2.
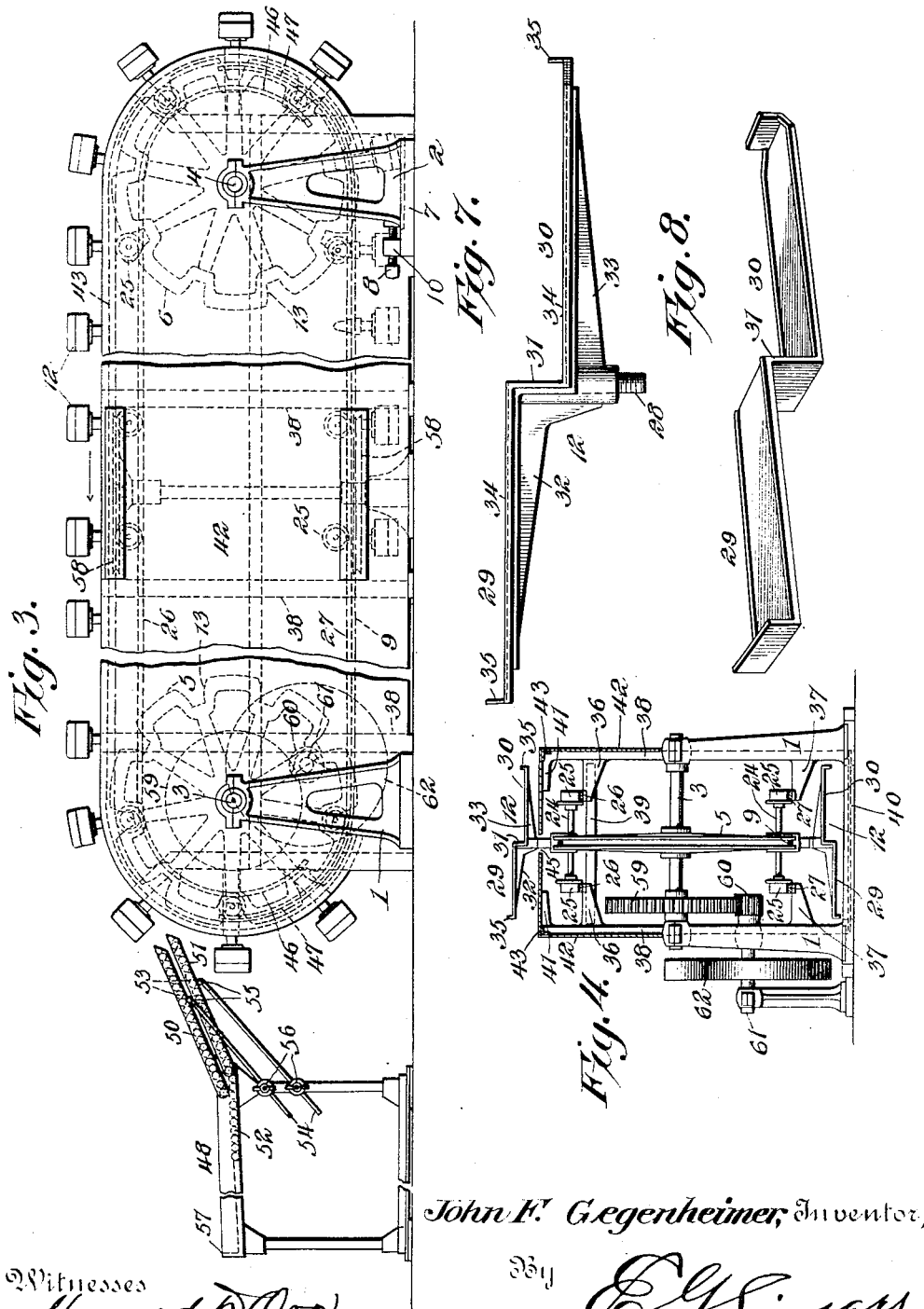

No. 800,639. PATENTED OCT. 3, 1905.
J. F. GEGENHEIMER.
CONVEYER FOR BOTTLES, &c.
APPLICATION FILED OCT. 15, 1903.

3 SHEETS—SHEET 3.

John F. Gegenheimer, Inventor

Witnesses
Howard D. Orr
N. F. Riley

By
E. G. Siggers
Attorney

UNITED STATES PATENT OFFICE.

JOHN F. GEGENHEIMER, OF GLASSBORO, NEW JERSEY.

CONVEYER FOR BOTTLES, &c.

No. 800,639.　　　Specification of Letters Patent.　　　Patented Oct. 3, 1905.

Application filed October 15, 1903. Serial No. 177,193.

*To all whom it may concern:*

Be it known that I, JOHN F. GEGENHEIMER, a citizen of the United States, residing at Glassboro, in the county of Gloucester and State of New Jersey, have invented a new and useful Conveyer for Bottles, &c., of which the following is a specification.

The invention relates to a conveyer for carrying bottles and other articles of glass to the leers or annealing-ovens.

The object of the present invention is to improve the construction of conveyers and to provide a simple, inexpensive, and efficient one of great strength and durability designed particularly for conveying glass bottles and other articles of glassware from the point where they are blown and finished to the annealing-oven or leer and adapted to greatly reduce the number of boys usually required for handling such articles and capable of enabling a large number of the latter to be quickly transferred from one place to another.

A further object of the invention is to provide a conveyer of this character adapted particularly for use in glass-works where only a small amount of space is available for a conveyer and capable of having different portions of it arranged at an angle to each other to suit the space in which the conveyer is to be placed.

Another object of the invention is to provide a conveyer capable of automatically discharging its contents when the same arrive at its discharge end and adapted to deliver flat bottles and similar objects to a receiving-table with the same facility as round bottles.

Furthermore, the invention has for its object to improve the means for connecting the carriers with the cable whereby the carriers are maintained at the proper interval and are effectually prevented from slipping on the cable.

The invention also has for its object to provide a carrier having a plurality of surfaces or supporting portions for the reception of bottles and other articles and to enable several kinds of such articles to be maintained separate from each other and to be delivered to separate portions of the receiving-table to prevent the several kinds or styles from becoming mixed while transferring them to the leers or annealing-ovens.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 6:
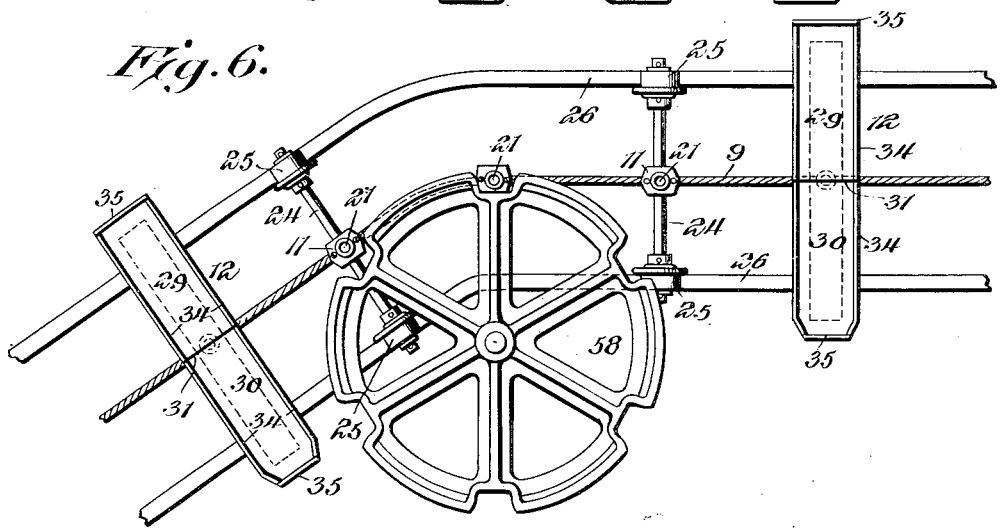

In the drawings, Figure 1 is a plan view of a portion of a conveyer constructed in accordance with this invention, the central portion and one end being illustrated for convenience. Fig. 2 is a plan view showing the other end of the conveyer. Fig. 3 is a side elevation showing the central portion and both ends of the conveyer. Fig. 4 is an end elevation illustrating the construction of the driving mechanism. Fig. 5 is an enlarged elevation of a portion of the conveyer, showing one of the clamp-engaging wheels. Fig. 6 is a plan view of a portion of the conveyer, illustrating the arrangement of the horizontal clamp-engaging guide-wheels. Fig. 7 is a side elevation of one of the carriers. Fig. 8 is a perspective view of the same. Fig. 9 is an elevation of one of the clamps. Fig. 10 is a vertical sectional view of the same. Fig. 11 is a plan view of the same. Fig. 12 is a reverse plan view of the same.

Like numerals of reference designate corresponding parts in all the figures of the drawings.

1 and 2 designate vertical standards arranged in pairs at the ends of the conveyer and provided at their top with suitable bearings for the reception of horizontal shafts 3 and 4, upon which are mounted vertical clamp-engaging cable-carrying wheels 5 and 6. The standards are approximately triangular or V-shaped, as shown, being composed of inclined sides connected at the top and bottom and constructed of flanged metal, or any other desired construction may be provided. The standards 1 are stationary, and the other standards 2 are mounted in suitable ways of sill-pieces 7, which receive the standards 2 and which are provided with adjusting-screws 8 for tightening the cable 9. The adjusting-screws are disposed horizontally, being mounted in threaded openings or projections 10 and arranged at the inner sides of the standards, as clearly shown in Figs. 1 and 3. The projections may be constructed in any desired manner and may consist of a transversely-disposed connecting bar or piece.

The endless cable 9, which is constructed of steel wire, is arranged in peripheral grooves of the upright wheels 5 and 6, and it has mounted upon it at regular intervals clamps 11, which support carriers 12 and which provide projecting portions for engaging corresponding recesses 13 of the wheels 5 and 6, whereby the wheels and the endless cable form substantially sprocket-gearing. By this construction the conveyer is positively operated when either of the wheels 5 and 6 is driven. Each clamp 11 is composed of upper and lower sections 14 and 15, provided with laterally-projecting portions or ears 16 and 17 and connected by screws 18. The adjacent faces of the upper and lower sections of the clamp are provided with corresponding semicircular recesses 19, which provide a cable-receiving aperture when the sections of the clamp are assembled. The clamp is provided with an interior chamber 20, located at and formed by enlarging the recesses of the sections, and the upper section is provided with a socket 21 and has an opening 22 in the bottom thereof to provide a filling-opening for the said chamber 20. In applying the clamp to the cable the sections are separated and the cable is placed in the opening 19, and the sections are then tightly clamped to the cable by the screws 18. The chamber 20 is then filled with Babbitt metal, which is poured through the opening 22. When the Babbitt metal cools, the clamp will be firmly secured to the cable and will be effectually prevented from slipping. The lower section 15, which is engaged by the end wheels 5 and 6, is tapered and rounded, as shown, and it is provided in the lower portion with a transverse opening 23, designed to receive an axle or spindle 24, on which is mounted flanged wheels 25. The flanged carrying-wheels, which are journaled on the ends of the shaft or axle 24, run upon upper and lower tracks 26 and 27 and are adapted to support the upper and lower flights of the cable to prevent the same from sagging at the center and also to avoid straining the cable. The shaft or axle 24 is suitably fixed to the lower portion of the clamp, and it is provided at its ends with spindles for the reception of the wheels 25. The lower portion or section of the clamp is preferably constructed of flanged material, as indicated in Figs. 9 to 12, inclusive, and is provided at opposite sides with recesses forming a central web. The recesses 13 of the wheels 5 and 6 taper inwardly to conform to the shape of the inner or lower portions of the clamps, and they intersect the periphery of the wheels, the intermediate portions being provided with the grooves for the reception of the cable. The threaded socket 21 of the clamp is designed to receive a threaded stem 28 of the carrier 12, and the latter is designed to be constructed, as illustrated in Figs. 7 and 8 of the accompanying drawings, with oppositely-disposed upper and lower receptacles or supporting portions 29 and 30, arranged in different horizontal and vertical planes and extending in opposite directions from the intermediate stem or shank 28. The supporting portions 29 and 30 are connected at their adjacent ends by an intermediate upright portion 31, which is disposed above the stem, and in order to stiffen the supporting portions 29 and 30 the carrier is provided at its lower face with longitudinal webs or flanges 32 and 33, the flange or web 32 being extended at its inner end along the upper portion of the stem 28. The upper and lower supporting portions or receptacles 29 and 30 have a length to receive a bottle when the same is placed in a horizontal position, and the central connecting portion 31 forms an inner end wall for the lower receptacle or portion 30. The lower portion of the stem 28 is provided with screw-threads for engaging the socket of the clamp; but the carrier may be mounted on the clamp and maintained in fixed relation with the conveyer in any other desired manner, and the socket and stem may be reversed. The upper and lower supporting portions of the carrier are provided with side and end flanges 34 and 35 to prevent round bottles and similar articles from rolling off or being thrown from the carrier by the motion of the conveyer. The end flanges extend a considerable distance above the side flanges, which are very low and form only slight projections, so that the bottles or other articles will slide or roll off the carrier and be discharged upon the receiving-table when the former is tilted laterally or inclined, as hereinafter explained. The double carrier is designed especially for use when several styles or kinds of bottles or other articles are being manufactured simultaneously, and the upper and lower supporting portions will enable several styles or kinds to be handled separately from each other without liability of being mixed. Instead of employing a double carrier a single supporting-surface may be used, and when so arranged the supporting-stem will be centrally disposed. The supporting-stem may be secured in a socket of either the clamp or the carrier by a set-screw to facilitate a ready separation of the parts, so that a single carrier may be substituted for the double carrier, and vice versa. Also the stems and sockets may be of polygonal shape in cross-section, if desired.

The flanged supporting-wheels are provided at their inner sides or faces with flanges for engaging the side edges of the upper and lower tracks, and the latter are mounted on inwardly-extending arms or brackets 36 and 37, preferably formed integral with frames or uprights 38, which are arranged at intervals and which are connected by suitable transverse bars or pieces 39 and 40. The uprights or frames 38 are provided at their tops with inwardly-extending arms 41, and they support sheet-metal plates or pieces which form a casing 42 for the conveyer. The uprights or frames are also connected by longitudinal bars or beams 43, arranged at the top of the framework, as clearly shown in Fig. 4. The bars and other members of the supporting-framework may be either flanged or plain, and the supporting-framework may be constructed in any desired manner to secure the necessary strength. The casing 42, which is supported by the framework, consists of upright and horizontal portions, the latter being located at the top of the framework and terminating short of the longitudinal center thereof to provide a central longitudinal opening 45 for the reception or passage of the stems or portions which connect the carriers with the clamps. The tracks consist of flat bars or rails having curved or overlapped portions 46 and 47 arranged at the ends of the conveyer and adapted to receive and guide the wheels, whereby the latter are transferred from one track to the other.

The conveyer travels in the direction of the arrow in Fig. 3 of the drawings, and the carriers are adapted to deposit their contents upon a receiving-table 48, having a central longitudinal partition 49 to divide it into separate portions or compartments and supported by suitable legs, as shown. The table is provided at its receiving end with permanently-hinged sections 50 and 51, which are adapted to be swung upward and downward to arrange them in proper position to receive the contents of the carriers. The body portion of the table is provided adjacent to its receiving end with a series of rollers 52, and the hinged sections 50 and 51 are also provided with rollers 53 for facilitating the discharge of the contents of the carriers. The hinged sections are located a short distance below the plane of the upper flight of the endless carrier or conveyer, and when the carriers arrive at the discharging end of the conveyer they are automatically tilted or inclined as they descend toward the receiving-table, and their contents are thereby discharged upon the same. The inclination is sufficient to cause the contents of the carriers to roll over the side flanges 34, and the rollers cause the bottles or other articles to slide readily down the inclined sections upon the receiving-table. Round bottles will readily roll down the inclined sections; but the rollers 52 and 53 are especially advantageous in handling paneled bottles and various other articles. The hinged sections of the receiving-table are supported in their adjusted position by braces 54, hinged at their upper ends 55 to the sections and secured at their lower portions by suitable clamping devices 56. These clamping devices may consist of set-screws or thumb-nuts, and they will permit the hinged sections to be readily adjusted to suit the character of the goods to be handled. The table is also designed to be adjusted or moved toward and from the conveyer to enable the hinged sections to be positioned properly with relation to the carrier, so that the latter will clear the upper ends of the hinged sections 50 and 51 and properly deliver their contents to the same. The table is slightly inclined at the top, as shown, and it is provided at its outer end with a flange or stop 57 to prevent the bottles or other articles from rolling off. The rollers 52 of the table terminate short of the center, and the lower portion of the top of the table retards the downward movement of the bottles and other articles and prevents the same from being broken or otherwise injured. The rollers of the table and its hinged sections, the lower portion of the top of the table, and the carriers are covered with asbestos to prevent the hot bottles or other articles from being injured through contact with cold metallic surfaces.

The conveyer is especially adapted for use in glass factories, where there is often little available space for such an apparatus, and the flexible character of the endless cable will permit the conveyer to be deflected laterally in any desired direction, and for this purpose horizontal guide-wheels 58 are employed. These guide-wheels, which are designed to be arranged in a suitable casing, are mounted upon a vertical shaft and have grooved peripheries to receive the cable. These guide-wheels are also provided at intervals with recesses to receive the clamps, which taper transversely at opposite sides of the center to fit the guide-wheels and to enable the same to be arranged at either side of the conveyer. By this construction the conveyer may be caused to travel a circuitous path around the glass-works in which it is used, and the manufactured articles may be placed on the carriers at various points throughout the length of the conveyer, and they will be automatically delivered upon the receiving-table, from which they can be quickly transferred to the leers or annealing-chamber. This will enable the number of boys usually provided for this purpose to be greatly reduced, and breakage and other accidents to the manufactured articles incident to the employment of a large force of boys will also be greatly reduced, especially where the space is small and it is necessary for a large number of boys to operate therein.

The conveyer may be driven from either end, but preferably at the delivery end, and the shaft 3 carries a gear-wheel 59, which meshes with a pinion 60 of a lower laterally-extending shaft 61, which projects laterally from one side of the apparatus. The shaft 61 has keyed or otherwise secured to it a pulley 62, designed to receive a belt; but any other form of gearing may be employed, as will be readily apparent.

Having thus fully described my invention, what I claim as new, and desire to secure by Letters Patent, is—

1. An apparatus of the class described comprising an endless conveyer, a table arranged to receive the contents of the conveyer and having a fixed portion and provided with an adjustable inclined portion or section, the latter forming a continuation of the table in all of its adjustments, and means for automatically discharging the contents of the conveyer upon the inclined section or portion, substantially as described.

2. An apparatus of the class described, comprising an endless conveyer, a support arranged to receive the contents of the conveyer and having a fixed portion and provided with an adjustable portion or section hinged thereto and forming a continuation thereof in all of its adjustments, and means for automatically discharging the contents of the conveyer on the adjustable portion or section, substantially as described.

3. An apparatus of the class described comprising a conveyer, a support provided with a fixed portion and having an adjustable inclined portion or section permanently hinged at one end to the fixed portion and arranged to receive the contents of the conveyer, and means for automatically discharging the said contents upon the inclined portion or section, substantially as described.

4. An apparatus of the class described comprising a conveyer, a support or receptacle provided with a series of rollers to facilitate the movement of the contents of the conveyer over a portion of the support or receptacle, the latter being also provided with means for retarding such movement, and means for discharging the contents of the conveyer on the receptacle or support, substantially as described.

5. An apparatus of the class described comprising a conveyer, a table arranged to receive the contents of the conveyer and provided over a portion of its surface with rollers, a plurality of hinged sections provided with rollers and capable of independent adjustment, and means for supporting the hinged sections in their adjustment, substantially as described.

6. An apparatus of the class described comprising a conveyer provided with carriers having a plurality of receiving portions and arranged to be tilted, and a receiving-table having a plurality of adjustable portions arranged to coöperate with the receiving portions of the carriers, substantially as described.

7. An apparatus of the class described comprising an endless conveyer provided at intervals with carriers having receiving portions arranged at different elevations and provided with flanges and adapted to be tilted to cause the articles to roll over the flanges, and means coöperating with the carriers for receiving the contents thereof, substantially as described.

8. An apparatus of the class described, comprising a conveyer, and a table arranged to receive the contents of the conveyer and provided with a plurality of hinged sections arranged to coöperate with the conveyer.

9. An apparatus of the class described, comprising a conveyer, and a table arranged to receive the contents of the conveyer and provided with a plurality of hinged sections arranged in different planes and coöperating with the conveyer.

10. An apparatus of the class described, comprising a conveyer, and a table arranged to receive the contents of the conveyer and provided with a plurality of hinged sections having independent adjustment and coöperating with the conveyer.

11. An apparatus of the class described, comprising a conveyer provided with a plurality of receiving portions operating in different planes and adapted to be tilted, and a table having portions in different planes to coöperate with the receiving portions of the conveyer.

12. An apparatus of the class described, comprising a conveyer provided with a plurality of receiving portions arranged in different planes and adapted to be tilted, a receiving-table, and a plurality of inclined portions located between the table and the conveyer, said inclined portions being in different planes.

13. In an apparatus of the class described, a conveyer provided with a plurality of receiving portions arranged in different planes, in combination with a plurality of inclined portions also located in different planes and coöperating with the conveyer.

14. In an apparatus of the class described, a conveyer provided with rigidly-mounted bottle-carriers, each having a plurality of independent receptacles, the latter being of a length to receive a bottle when placed horizontally.

15. In an apparatus of the class described, a conveyer provided with rigidly-mounted bottle-carriers, each having independent receptacles located in different horizontal planes, and maintaining a fixed relation with the conveyer, and a central connecting portion for the receptacles forming an end wall for the lower receptacle.

16. In an apparatus of the class described, the combination with a conveyer, of a central stem mounted thereon, and a pair of independent receptacles located one on each side thereof and arranged in different horizontal planes, each receptacle extending to the stem.

17. In an apparatus of the class described, the combination with supporting-wheels, of an endless conveyer arranged thereon and provided with a rigidly-mounted carrier having a plurality of receiving portions arranged to be tilted simultaneously as the conveyer passes over the wheels.

18. In an apparatus of the class described, a conveyer provided with a rigidly-mounted carrier having a plurality of receiving portions located in different horizontal planes and arranged to be tilted simultaneously.

19. In an apparatus of the class described, a conveyer provided with a plurality of receptacles arranged in different horizontal planes, each receptacle being provided at opposite sides with means for retaining a bottle on it when the carrier is in a horizontal position, said means being adapted to permit the bottle to roll from the receptacle when the carrier is tilted.

20. An apparatus of the class described provided with an endless conveyer comprising a cable, clamps mounted on the cable and composed of separable sections and provided with means for connecting the sections, whereby they are clamped to the cable, each section being provided with a recess to form an interior chamber around the cable, a filling located within the chamber and engaging the cable to prevent the clamps from slipping thereon, carriers supported by the clamps, and means for engaging the clamps for actuating the cable, substantially as described.

21. In an apparatus of the class described, the combination of a cable, a clamp composed of sections detachably secured together and engaging the cable, said clamp being provided with an interior chamber or recess surrounding the cable, and a filling located within the chamber or recess and engaging the cable to prevent the clamp from slipping thereon, substantially as described.

22. In an apparatus of the class described, the combination of a cable, a clamp, a carrier supported by the clamp, one of the parts being provided with a stem and the other having a socket receiving the stem, whereby the carrier is detachably secured in position, and means for engaging the clamp for actuating the cable, substantially as described.

23. In an apparatus of the class described, the combination of a cable, a clamp permanently mounted on the cable, a carrier supported by the clamp and detachably secured to the same, and means for engaging the clamp for actuating the cable.

24. An apparatus of the class described comprising a framework, vertical wheels, an endless cable arranged on the vertical wheels, clamps mounted on the cable and engaged by the wheels, carriers supported by the clamps, and a casing supported by the framework and having a longitudinal opening receiving the carriers, substantially as described.

25. In an apparatus of the class described, the combination of a cable, a clamp mounted on the cable and extending above and below the same, a carrier mounted on the upper portion of the clamp, means engaging the lower portion of the clamp for actuating the cable, wheels also carried by the lower portion of the clamp and located below the cable when the clamp is in an upright position, and tracks on which the wheels run, substantially as described.

In testimony that I claim the foregoing as my own I have hereto affixed my signature in the presence of two witnesses.

JOHN F. GEGENHEIMER.

Witnesses:
ELLISON T. LEAF,
WESLY D. DILKS.